United States Patent [19]

Hirai et al.

[11] Patent Number: 5,070,172
[45] Date of Patent: Dec. 3, 1991

[54] PROCESS FOR PRODUCING POLYURETHANE

[75] Inventors: Koji Hirai; Shunro Taniguchi, both of Kurashiki; Michihiro Ishiguro, Hasaki; Yoshifumi Murata, Nakajo; Shinichi Yokota, Kurashiki; Masao Ishii, Hasaki; Noriaki Yoshimura, Kurashiki; Takayuki Okamura, Okayama, all of Japan

[73] Assignee: Kuraray Co., Ltd., Kurashiki, Japan

[21] Appl. No.: 254,651

[22] PCT Filed: Jan. 22, 1987

[86] PCT No.: PCT/JP87/00042

§ 371 Date: Sep. 22, 1988

§ 102(e) Date: Sep. 22, 1988

[87] PCT Pub. No.: WO88/05447

PCT Pub. Date: Jul. 28, 1988

[51] Int. Cl.$^5$ .................. C08G 18/40; C08G 18/42; C08G 18/44; C08G 18/48
[52] U.S. Cl. .................................. 528/76; 528/80; 528/83; 528/85; 528/370
[58] Field of Search .............. 528/80, 83, 76, 85, 528/370

[56] References Cited

U.S. PATENT DOCUMENTS

| | | | |
|---|---|---|---|
| 4,010,311 | 3/1977 | Lewis et al. | 528/59 |
| 4,087,481 | 5/1978 | Onder | 525/419 |
| 4,153,764 | 5/1979 | Blount | 528/80 |
| 4,184,990 | 1/1980 | Reischl et al. | 528/80 |
| 4,587,275 | 5/1986 | Kopp et al. | 528/80 |
| 4,722,946 | 2/1988 | Hostettler | 528/83 |
| 4,731,392 | 3/1988 | Streu et al. | 528/83 |
| 4,777,220 | 10/1988 | Halpaap et al. | 528/83 |
| 4,778,830 | 10/1988 | Streu et al. | 521/172 |
| 4,788,262 | 11/1988 | Markusch et al. | 528/83 |
| 4,816,544 | 3/1989 | Komiya et al. | 528/73 |

Primary Examiner—John Kight, III
Assistant Examiner—Rabon Sergent
Attorney, Agent, or Firm—Oblon, Spivak, McClelland, Maier & Neustadt

[57] ABSTRACT

In the preparation of a polyurethane from a polymeric polyol and an organic polyisocyanate, by using as the polyol a polymeric polyol containing in the molecule thereof 2-methyl-1,8-octanediol residue, a novel polyurethane having excellent resistance to hydrolysis, low temperature characteristics and abrasion resistance can be obtained.

14 Claims, 1 Drawing Sheet

PROCESS FOR PRODUCING POLYURETHANE

TECHNICAL FIELD

This invention relates to a method of preparing a novel polyurethane from a polyester polyol or a polycarbonate polyol and an organic polyisocyanate, more particularly to a method of preparing a novel polyurethane having excellent resistance to hydrolysis, excellent characteristics at low temperatures and resistance to abrasion.

BACKGROUND ART

Polyurethanes have been produced by reaction of a polymeric polyol with an organic diisocyanate and as required a low molecular compound having more than two active hydrogen atoms. As the polymeric polyols being used are the ones of ester type such as polyester polyols prepared by polycondensation of a dicarboxylic acid component such as aliphatic dicarboxylic acids including succinic acid, glutaric acid, adipic acid, azelaic acid, sebacic acid, etc., with a glycol component such as ethylene glycol, propylene glycol, 1,4-butanediol, neopentyl glycol, 1,6-hexanediol, etc., and polycarbonate polyols prepared by ester exchange reaction of 1,6-hexanediol with diphenyl carbonate. ( Keiji Iwata: POLYURETHANE RESINS, p.56 to 61, Nikkan Kogyo Shinbunsha, published on July 30, 1975)

However, the polyurethanes prepared from the above polyester polyols are inferior in resistance to hydrolysis, and thereby surfaces o the films formed from the polyurethanes will become sticky or will crack after a shoft period of time. Therefore, this type of polyurethane is limited in its application. In order to improve resistance to hydrolysis of such polyurethanes it is effective to make lower the concentration of ester group in the polyester polyol residue existing as the polymeric polyol residue in the polyurethane. For this purpose it is preferred to use as the polymeric polyol a polyester polyol prepared from a glycol and a dicarboxylic acid both having a greater number of carbon atoms. However the polyurethane thus obtained from such polyester polyol has, though excellent in resistance to hydrolysis, a greater tendency toward crystallization, and when left standing for some time under an atomosphere of low temperature lowers flexibility as represented by bending resistance.

On the other hand, polyurethanes prepared from the afore-mentioned polycarbonates as the polymeric polyol are, though excellent in resistance to hydrolysis, inferior in low temperature characteristics because they have high coagulation temperatures, and also because they have high glass transition points and at the same time have a great tendency toward crystallization, as is typical in the case of most widely used polycarbonate obtained from 1,6-hexanediol.

In order to solve these problems and to obtain a polyurethane being excellent in both resistance to hydrolysis and low temperature characteristics, the inventors have proposed in EPA-194452 Specification or JPA 195117/1985 a method comprising using 1,9-nonanediol to improve resistance to hydrolysis as the glycol for preparing polyester polyol or polycarbonate polyol to be reacted with a polyisocyanate, and using in combination therewith 3-methyl-1,5-pentanediol to prevent a decrease in low temperature characteristics caused by an increase in tendency toward crystallization attendant upon the use of 1,9-nonanediol. Though this method is an excellent one, it is often the case that, depending on the end-use, a still higher degree of satisfying both resistance to hydrolysis and low temperature characteristics is required. Particularly when used for artificial leathers, synthetic leathers, etc., it is required to satisfy the above requirements while using a soft polyurethane, and moreover it is strictly required to give the polyurethane such characteristics at low temperature as surface properties, particularly bending resistance, resistance to surface wear, etc. In such cases the improvement effect proposed by the present inventors in the above-cited method will not be sufficient. For instance a polyurethane having soft constitution, that is, one in which the content of hard segments is small or in which the molecular weight of soft segments are high, crystallization degree of polyester polyol or polycarbonate polyol will increase, and a small amount of addition of 3-methyl-1,5-pentanediol can not fully suppress the tendency toward crystallization of polyurethane attributable to 1,9-nonanediol, resulting in an inferiority in low temperature characteristics. There is another method of increasing the amount of the co-used 3-methyl-1,5-pentanediol in the preparation of the raw material polyester polyol or polycarbonate polyol to give non-crystallisability. In this case resistance to hydrolysis of the obtained polyurethane decreases, and besides, the glass transition temperature of the raw material polyester polyol or polycarbonate polyol itself becomes higher, resulting in creation of a problem of decrease in low temperature characteristics of the obtained polyurethane.

DISCLOSURE OF THE INVENTION

Therefore an object of the present invention is to provide a method of producing a soft polyurethane, in which crystallization caused by raw material polyester polyol or polycarbonate polyol is suppressed even in the case that the content of hard segments is low or the molecular weight of soft segments is high, and which is excellent in resistance to hydrolysis and at the same time even at low temperatures of $-20°$ C. to $-30°$ C. is excellent in bending strength and abrasion resistance on the surface.

According to the present invention the above object can readily be achieved by, in the preparation of polyurethane from a polymeric polyol and an organic polyisocyanate, a method of preparing polyurethane characterized by using a polymeric polyol having 2-methyl-1,8-octanediol residue represented by the formula [I]:

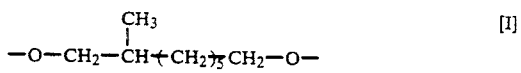

as the afore-mentioned polyol. Particularly, the object can be very readily achieved by using a polyester polyol having an average molecular weight of 500 to 30,000 obtained by reacting as the afore-mentioned polymeric polyol 2-methyl-1,8-octanediol or a mixed glycol containing said diol as a main component, particularly a mixed glycol having more than 6 carbon atoms, with a dicarboxylic acid, or by using a polycarbonate polyol having an average molecular weight of 500 to 30,000 obtained by reacting 2-methyl-1,8-octanediol or a mixed glycol having said glycol as a main component, particularly a mixed glycol having more than 6 carbon atoms, with a dicarbonate.

THE BEST MODE FOR CARRYING OUT THE INVENTION

Figure 1:
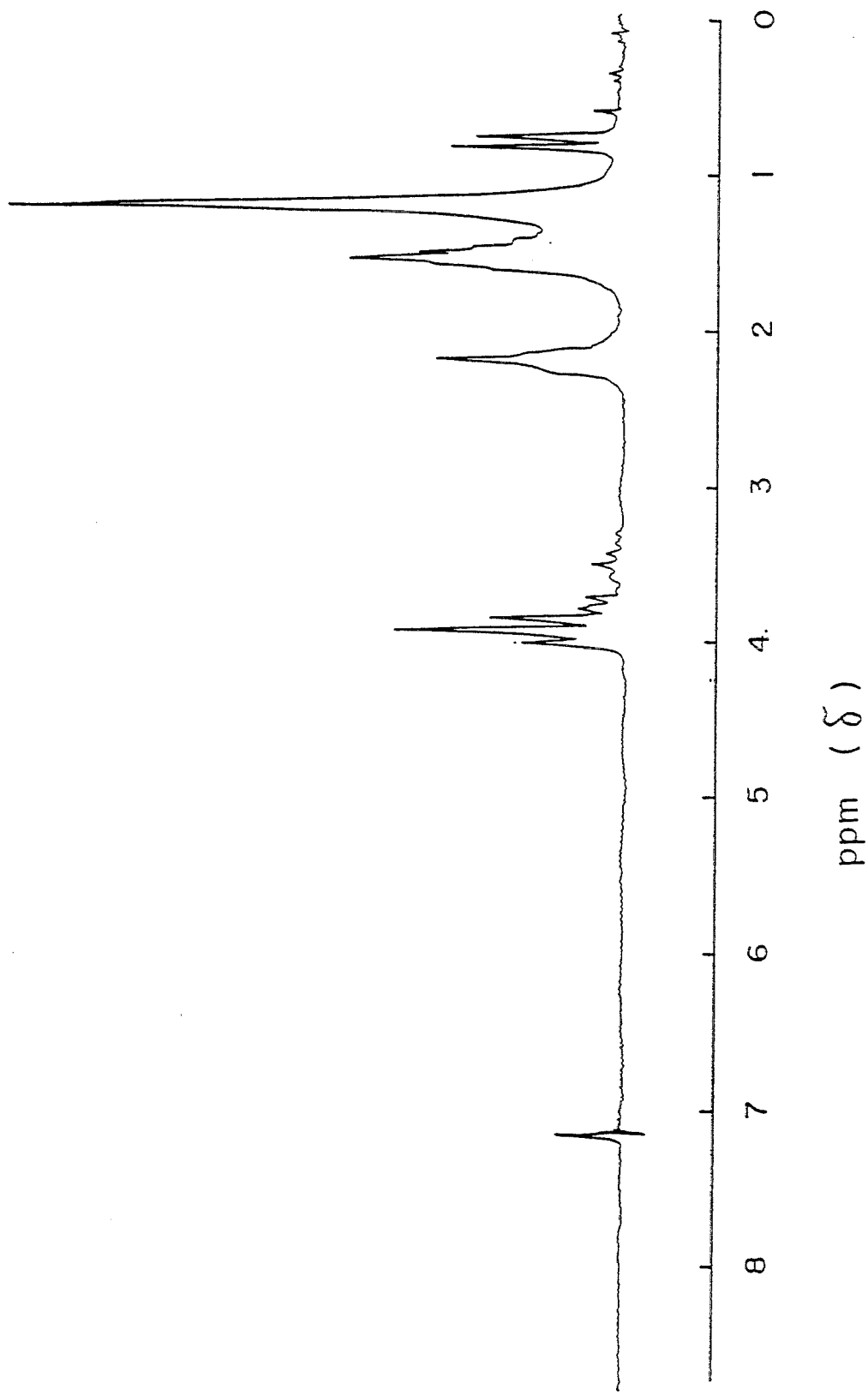
FIG. 1 shows a $^1$H nuclear magnetic resonance spectrum of the polyester polyol used in the preparation according to the present invention obtained by reaction of an equivalent mixture of 2-methyl-1,8-octanediol and 1,9-nonanediol with adipic acid.

The polymeric polyol used as raw material in this invention is a polymeric polyol containing a group represented by the afore-described formula [I] as glycol residue, typical example of which is a polyester polyol or a polycarbonate polyol containing the glycol residue represented by the afore-described formula [I]. Particularly preferred polyol is a novel polyester or polycarbonate having hydroxyl groups at the ends of the molecule thereof and having a group as repeating unit represented by the formula [II]:

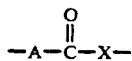  [II]

or a novel polyester or polycarbonate having hydroxyl groups at the ends of the molecule thereof and also having a group as repeating unit represented by the formula [III]:

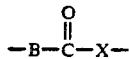  [III]

wherein —A— is the group represented by the afore-described formula [I], —X— means, differing with the case of polyester polyol from the case of polycarbonate polyol, a group represented by

in the case of the former (R means as explained later an acid residue of dicarboxylic acid), or a —O— group in the case of the latter. —B— will be explained later but is a diol residue other than and being optionally present together with, the group represented by [I].

As described above it is necessary for the polymeric polyol used in this invention to contain a group represented by the afore-described [I], and as a representative compound giving said group is mentioned 2-methyl-1,8-octanediol. Surprisingly, the group is the one which very effectively suppress crystallization of polyurethane and at the same time is excellent in resistance to hydrolysis, low temperature characteristics and flexibility. Methods have been known to use, as a glycol capable of forming glycol residue of a polymeric polyol for suppressing crystallization of polyurethane, one having an alkyl side chain such as neopentyl glycol, 2-methyl-1,3-propanediol, 1,3-butylene glycol, propylene glycol, etc., but the usage of these glycols either alone or in the form of a mixture thereof can not give a polyurethane having both flexibility and non-cristallizability without decreasing resistance to hydrolysis, and further having a good flexibility at low temperatures.

As —B1— which must be present in the afore-described [III] which may be present in the polymeric polyol used in the preparation according to the present invention, mentions are made of a group represented by the formula:

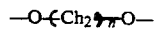  [IV]

wherein n means an integer of 6 to 9, that is, the residue of a diol represented by the formula:

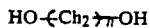  [IVa]

and a group represented by the formula:

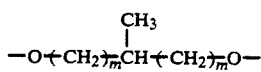  [V]

wherein m means an integer of 2 to 4, that is, the residue of a branched alkanediol represented by the formula:

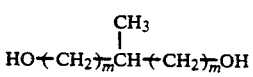  [Va]

When the group represented by the formula [V] is contained, it is preferred that together with [I] the group represented by the formula [IV] be also contained.

In the group represented by the above-mentioned [IV], n is an integer of 6 to 9 and preferably 6 or 9. As typical compounds represented by the formula [IV], that is, alkanediols represented by the formula [IVa], mention is made of 1,9-nonanediol or 1,6-hexanediol. Particularly when low temperature characteristics and resistance to hydrolysis are required, 1,9-nonanediol is preferred. One of the features of the present invention resides in that 2-methyl-1,8-octanediol can render 1,9-nonanediol the most non-crystallizable among other diols having a side chain, and thereby satisfies to a high degree all of resistance to hydrolysis, low temperature characteristics and flexibility. In the group represented by [V], m is an integer of 2 to 4, preferably 2. As a typical example of the compound which donates the group represented by [V], that is, branched alkanediol represented by the formula [Va], there is mentioned 3-methyl-1,5-pentanediol. Here employment of other diols having not greater than 5 carbon atoms will cause a great decrease in resistance to hydrolysis and low temperature flexibility of the obtained polyurethane.

In the present invention the group represented by the afore-described [I] in a polyester polyol or polycarbonate polyol is contained in an amount of more than 10 wt%, preferably more than 15 wt%, most preferably more than 20 wt% of the total glycol residue, and may even be 100 wt%. The ratio of the group represented by the afore-described [IV] or [V] is less than 90 wt%, preferably less than 85 wt%, most preferably less than 80 wt% of the total glycol residue, respectively.

In the case where the afore-described [I], [IV] and [V] are present in the molecule, the polymeric polyol is a polymeric diol. For obtaining a polymeric polyol, it is necessary to have, depending on the number of hydroxyl groups required for the polyol, for example, trimethylol propane residue be present.

As the polyester polyols used in the preparation according to the present invention aliphatic dicarboxylic acids having 5 to 12 carbon atoms, or aromatic dicarboxylic acids are preferred. Especially preferred are aliphatic dicarboxylic acids. Examples of the aliphatic dicarboxylic acids are glutaric acid, adipic acid, pimelic acid, suberic acid, azelaic acid, sebacic acid, etc., and examples of aromatic dicarboxylic acids are phthalic acid, terephthalic acid, isophthalic acid, etc. For the purpose of obtaining a polyurethane excellent particularly in resistance to hydrolysis and flexibility under a low-temperature atmosphere, exployment of adipic acid, azelaic acid or sebacic acid, particularly of azelaic acid is preferred. These dicarboxylic acids may be used alone or in combination of more than two.

The polyester polyol or polycarbonate polyol used in the present invention can be prepared by a method similar to the known method for the manufacture of polyethylene terephthalate or polybutylene terephthalate, that is, by ester exchange reaction or by direct esterification followed by melt-polycondensation. The molecular weight is preferably in the range from 500 to 30,000, more preferably in the range from 600 to 8,000. Further the number of the hydroxyl groups present at the molecular ends of the polyester polyol is, though not unconditionally specified depending on the end-use of the polyurethane finally obtainable, preferably 2 or more, more preferably in the range of 2 to 4 per molecule.

As the dicarbonate for preparing the polycarbonate polyol used in the present invention preferred is dialkyl carbonate such as ethylene carbonate, propylene carbonate, etc., or diaryl carbonate.

The polycarbonate polyol used in the preparation according to the present invention can be prepared by a method similar to the known method for the manufacture of polycarbonate from diphenyl carbonate and bisphenol A, that is, by ester exchange reaction. The average molecular weight is preferably in the range from 500 to 30,000, more preferably in the range from 600 to 8,000. Further the number of the hydroxyl groups present at the molecular ends of the polycarbonate polyol is, though not unconditionally specified depending on the end-use of the polyurethane finally obtainable, preferably 2 or more, more preferably in the range of from 2 to 4 per molecule.

Suitable polyisocyanates used in the preparation of the polyurethane of this invention include known organic aliphatic, alicyclic, aromatic polyisocyanates having two or more isocyanate groups therein, particularly diisocyanates such as 4'4-diphenylmethane diisocyanate, p-phenylene diisocyanate, tolylene diisocyanate, 1,5-naphthylene diisocyanate, xylilene diisocyanate, hexamethylene diisocyanate, isophorone diisocyanate, 4'4-dicyclohexylmethane diisocyanate, etc., triisocyanates comprising trimethylolpropane or glycerine having added thereto three molar proportions of tolylene diisocyanate, and so on.

Any known chain extender may also be used as required in the preparation of the polyurethane of this invention. Examples of the chain extenders are those conventionally used in the polyurethane industry, e.g. low molecular compounds having at least two hydrogen atoms reactable with an isocyanate, such as ethylene glycol, 1,4-butanediol, xylilene glycol, bishydroxybenzene, neopentyl glycol, 3,3'-dichloro-4,4'-diaminodiphenylmethane, hydrazine, dihydrazide, trimethylolpropane, glycerine, etc.

Any known techniques of urethanization reaction may be used for the preparation of the polyurethane. For example in order to produce so-called thermoplastic polyurethane, employed is a method comprising successively preheating a polymeric polyol alone or in a mixture with a low molecular compound having active carbons to a temperature of about 40° to about 100° C., adding thereto a polyisocyanate in such an amount that the equivalent ratio of active hydrogen atoms of these compounds to the isocyanate groups will be about 1:1, stirring the mixture vigorously for a short time, and allowing it to stand at about 50° to about 150° C. In this case, a method of obtaining the polyurethane via urethane prepolymer may also be employed. Usually the polyisocyanate is used in a slight excess to avoid influence of moisture. These reactions may also be effected in a solvent consisting of dimethylformamide, diethylformamide, dimethylsulfoxide, dimethylacetamide, tetrahydrofuran, isopropanol, benzene, toluene, ethyl-Cellosolve, Trichlene, etc. alone or in combination. When a solvent is used, its amount should preferably be such that the polyurethane concentration in the final reaction mixture will be in the range from 10 to 40 wt% to obtain a polyurethane of having a high molecular weight. The number average molecular weight of the thus obtained thermoplastic polyurethane may, though not unconditionally specified depending on the end-use, preferably be in the range from 5,000 to 500,000, more preferably in the range from 10,000 to 300,000.

CAPABILITY OF EXPLOITATION IN THE INDUSTRY

Several examples of applications of the polyurethane obtained according to the present invention will be described hereinbelow.

(1) Pellets of a substantially linear thermoplastic polyurethane are prepared. They are heated to fusion and formed into an elastomeric product by injection molding, extrusion molding, calendering, and so on.

(2) A polymeric polyol, a polyisocyanate and a chain extender are mixed together, or a prepolymer having at the ends thereof isocyanate groups orhydroxyl groups is first synthesized by reaction of a polymeric polyol with a polyisocyanate and then mixed with a chain extender or a polyisocyanate, to given an reaction-injection moldable elastomer or to be placed for use as paints, adhesives, etc.

(3) A polyurethane solution is prepared either by dissolving the polyurethane in a solvent or by synthesizing the polyurethane in a solvent, and placed for use as coating agent, dipping agent or adjusting agent for hand of textiles, synthetic leathers, artificial leathers, textiles, and so on.

(4) A prepolymer having isocyanate groups at the molecular ends thereof is dissolved in a solvent, and a chain extender, etc. are added to the solution to prepare a stable spinning dope. An elastic fiber is produced from the dope by dry spinning method or wet spinning method.

(5) A foaming agent and other additives are incorporated into a polymeric polyol, and to the composition a polyisocyanate or a prepolymer having isocyanate groups at the ends thereof is added, followed by high-speed agitation for foaming the mixture to give a foam product.

More detailed embodiments of the end-uses of the polyurethane obtained according to the present invention include sheets, films, rolls, gears, solid tires, belts, hoses, tubes, shock absorbers, gaskets, shoe soles (micro-cellular, etc.), artificial leathers, finishing agents for textiles, cushions, paints, adhesives, binders, sealants, waterproof agents, floor materials, elastic fibers, and so forth.

EXAMPLES

The present invention will be explained in more detail by Examples and Comparative Examples. Evaluation of the physical properties and performances were made in the following methods:

(i) Melting temperature (Tm), enthalpy of melting (ΔHm), crystallization temperature (Tc), and enthalpy of crystallization (ΔHc) were each measured by using a differential scanning calorimeter [Rigaku Electric Co., Type DSC-8260B]. Heating or cooling rate was 20° C./min., and the weight of each specimen was 10 mg.

(ii) The resistance to hydrolysis of the polyurethane was evaluated in the following manner: A polyurethane film of 60μ was subjected to an accelerated test of hydrolysis in a hot water of 100° C. for 4 weeks. The viscosity of the polyurethane in a mixed solvent of dimethylformamide/toluene (wt. ratio: 7/3) solution before and after the test was measured and the retention ratio of the logarithmic viscosity before the test to that after the test was employed for comparison.

(iii) Low temperature flexibility was evaluated as follows: Test specimen prepared from a polyurethane film of 0.2 mm thick was subjected to a measurement by using a direct-reading dynamic viscoelastometer manufactured by Toy Sokki Co.," Vibron Model DDV-II" to give Tα value. Besides, a solution of the polyurethane was applied onto an artificial leather base material and dried and bending resistance of the leather was measured at −30° C. The bending resistance was measured by using a bending tester with a maximum stroke of 3 cm and minimum stroke of 1 cm, at a rate of 8600 strokes/hour. After more than 100,000 strokes, no noticeable change was indicated by ○, generation of slight scratch was marked as Δ, and such serious damage as to make the base material visible was marked as X. A specimen which has a low Tα and a good bending characteristics at low temperature is deemed to have succeeded in possessing both flexibility at low temperatures and non-crystallizability.

(iv) Resistance to abrasion on the surface was evaluated by an abrasion losses measured on a polyurethane film of 1 mm thick by using a taper type abrasion tester (H-22, weight: 1,000 g, 1,000 strokes) at 20° C. and at −25° C.

Compounds used were denoted by codes given in Table 1.

TABLE 1

| Code | Compound |
| --- | --- |
| 2-MOD | 2-methyl-1,8-octanediol |
| ND | 1,9-nonanediol |
| HG | 1,6-hexanediol |
| 3-MPD | 3-methyl-1,5-pentanediol |
| BD | 1,4-butanediol |
| MDI | 4,4'-diphenylmethane diisocyanate |

REFERENCE EXAMPLE 1

Preparation of polyester diol

A mixture of 1600 g of 2-methyl-1,8-octanediol and 1460 g of adipic acid (molar ratio of 2-methyl-1,8-octanediol to adipic acid: 1.3/1) was subjected to esterification under a nitrogen gas stream of normal pressure at about 195° C. while distilling off condensed water. When the acid value of formed polyester fell below about 1, the degree of vacuum was increased gradually by operating a vacuum pump to complete the reaction. The thus obtained product was a liquid at room temperature, and had a viscosity at 25° C. of about 5,000 centipoise. The melting temperature (Tm), enthalpy of melting (ΔHm), crystallization temperature (Tc), and enthalpy of crystallization (ΔHc) of the thus obtained product was 19.0, 14.8, −11.8 and 18.3 respectively. The infrared adsorption spectrum of the obtained product showed an adsorption at 1735 cm$^{-1}$ (absorption resulting from an ester bond). The $^1$H nuclear magnetic resonance spectrum of the product measured in heavy chloroform solvent showed a resonance peak at 0.9 ppm attributable to the hydrogen of methyl group contained in 2-MOD and a resonance peak at 2.2 ppm attributable to the hydrogen of methylene group adjacent to C=O contained in adipic acid. These results proved that the obtained product was poly-2-methyl-1,8-octaneadipate having hydroxyl groups at both ends (hereinafter referred to as Polyester A). The hydroxyl group value and the acid value of Polyester A were 56 and 0.23 respectively, and therefrom the molecular weight was calculated to be about 2,000.

REFERENCE EXAMPLE 2

A polyester having properties shown in Table 2 (polyester B) was prepared in the same manner as in Reference Example 1 except that instead of 3-MOD a mixture of 2-MOD/ND in a mixing ratio of 5/5 by weight was used.

The $^1$H nuclear magnetic resonance spectrum of the obtained polyester measured in heavy chloroform solvent is shown in FIG. 1. From integrated values at a resonance peak at 0.9 ppm attributable to the hydrogen of methyl group contained in 2-MOD, a resonance peak at 4.0 ppm attributable to the hydrogen of methylene group adjacent to the oxygen atom each contained in 2-MOD and ND respectively and a resonance peak at 2.2 ppm attributable to the hydrogen of methylene group adjacent to C=O contained in adipic acid, calculated was molar ratio of diol residue of 2-MOD, diol residue of ND, and acid residue of adipic acid to be 0.58/0.57/1.00 which is closed to 0.575/0.575/1.00, a calculated value from the composition of the raw materials initially charged.

REFERENCE EXAMPLES 3 THROUGH 11

Polyesters having properties shown in Table 2 were prepared in the same manner as in Example 1, except that as acid component and diol component ones each given in Table 2 were used.

It is seen from Table 2 that, among the polyester polyols derived from 1,9-nonanediol and adipic acid, 2-methyl-1,8-octanediol is expected to be superior to 3-methyl-1,5-pentane-diol in the effect of rendering non-crystallizability.

TABLE 2

| | | Acid Component | Diol Component (Weight Ratio) | Molecular Weight | Hydroxyl Group Value | Acid Value | Heating | | Cooling | |
| --- | --- | --- | --- | --- | --- | --- | --- | --- | --- | --- |
| | | | | | | | Tm | ΔHm | Tc | ΔHc |
| Reference Example 1 | Polyester A | Adipic acid | 2-MOD | 2,000 | 56 | 0.23 | 19.0 | 14.8 | −11.8 | 18.3 |
| Reference | Polyester | Adipic | 2-MOD/ND (5/5) | 2,000 | 56 | 0.26 | 36.2 | 3.2 | 25.0 | 3.2 |

TABLE 2-continued

|  | Acid Component | Diol Component | (Weight Ratio) | Molecular Weight | Hydroxyl Group Value | Acid Value | Heating Tm | ΔHm | Cooling Tc | ΔHc |
|---|---|---|---|---|---|---|---|---|---|---|
| Example 2 | B | acid |  |  |  |  |  |  |  |  |
| Reference Example 3 | Polyester C | Adipic acid | 2-MOD/ND (3/7) | 2,000 | 56 | 0.26 | 48.3 | 12.6 | 25.8 | 13.5 |
| Reference Example 4 | Polyester D | Adipic acid | 2-MOD/3-MPD/ND (2/1/7) | 2,000 | 56 | 0.15 |  |  |  |  |
| Reference Example 5 | Polyester E | Adipic acid | 2-MOD/HD/ND (3/1/6) | 2,000 | 56 | 0.21 |  |  |  |  |
| Reference Example 6 | Polyester F | Azelaic acid | 2-MOD | 2,000 | 56 | 0.35 | 17.0 | 18.3 | −7.0 | 13.7 |
| Reference Example 7 | Polyester G | Azelaic acid | 2-MOD/ND (3/7) | 2,000 | 56 | 0.18 |  |  |  |  |
| Reference Example 8 | Polyester H | Adipic acid | ND | 2,000 | 56 | 0.24 | 64.7 | 25.6 | 41.5 | 25.3 |
| Reference Example 9 | Polyester I | Adipic acid | 3-MPD/ND (3/7) | 2,000 | 56 | 0.18 | 58.0 | 16.5 | 34.1 | 14.3 |
| Reference Example 10 | Polyester J | Adipic acid | 3-MPD/ND (5/5) | 2,000 | 56 | 0.12 | 58.0 | 16.5 | 34.1 | 14.3 |
| Reference Example 11 | Polyester K | Azelaic acid | 3-MPD/ND (3/7) | 2,000 | 56 | 0.22 |  |  |  |  |

Notes:
ΔHm: Enthalpy of melting
ΔHc: Enthalpy of crystallization
Tm: Melting temperature
Tc: Crystallization temperature

REFERENCE EXAMPLE 12

Preparation of polycarbonate diol

A mixture of 1730 g of 2-methyl-1,8-octanediol and 2140 g of diphenylcarbonate was heated under a nitrogen gas stream to a temperature of 200° C. to diltil off phenol from the reaction mixture. Then the temperature was gradually increased to 210° to 220° C. to distil off most of phenol, and the system was evacuated to a vacuum pressure of 6 to 10 mmHg while maintaining the temperature at 210° to 220° C. to completely distil off remaining phenol, to give a liquid having a hydroxyl group value of 56. The molecular weight of the thus obtained product was found to be about 2,000 from a GPC analysis. The infrared absorption spectrum of the obtained product showed an absorption at 1750 cm$^{-1}$ and 1250 cm$^{-1}$ (absorption resulting from an carbonate bond). The $^1$H nuclear magnetic resonance spectrum of the product measured in heavy chloroform solvent showed a resonance peak at 0.9 ppm attributable to the hydrogen of methyl group contained in 2-MOD and a resonance peak at 4 to 4.2 ppm attributable to the hydrogen of methylene group contained in 2-MOD adjacent to carbonate group. These results proved that the obtained product was poly-2-methyl-1,8-octanediolcarbonate having hydroxyl groups at both ends (hereinafter referred to as Polycarbonate A).

REFERENCE EXAMPLES 13 THROUGH 16

Polycarbonates having a hydroxyl group value of 56 and the molecular weights of about 2,000 were prepared in the same manner as in Example 12, except that as diol component ones given in Table 3 were used.

TABLE 3

| Reference Example | Polycarbonate | Diol Components (Weight ratio) |
|---|---|---|
| 12 | Polycarbonate A | 2-MOD |
| 13 | Polycarbonate B | 2-MOD/ND (3/7) |
| 14 | Polycarbonate C | 2-MOD/ND (5/5) |
| 15 | Polycarbonate D | ND |
| 16 | Polycarbonate E | 3-MPD/ND (5/5) |

EXAMPLE 1

A mixture of one mol of Polyester A prepared in Reference Example 1, two mols of MDI (4,4'-diphenylmethane diisocyanate) and as chain extender one mol of D (1,4-butane-diol) in a mixed solvent of dimethylformamide and toluene (mixing ratio: 7:3) was subjected to reaction under a nitrogen gas stream at 70° C. to give a polyurethane solution having a viscosity of 1500 poise measured at 25° C. on the 30 wt% solution. The number average molecular weight of the thus obtained polyurethane measured by GPC (converted to Styrene) was 68,000.

The infrared absorption spectrum and $^1$H nuclear magnetic resonance spectrum of the polyurethane after having distilled off the solvent therefrom by drying under a reduced pressure gave absorptions at 1700 cm$^{-1}$, 1530 cm$^{-1}$, 1222 cm$^{-1}$, etc. in the former and peaks at 9.45 ppm (a peak attributable to —NHCOO—), 7 to 7.4 ppm (a peak attributable to

), 3.75 ppm (a peak attributable to the hydrogen in the methylene group contained in MDI residue), etc., proving the formation of a urethane bond.

The obtained polyurethane was tested for various properties. The results are shown in Table 4.

EXAMPLES 2 to 7 AND COMPARATIVE EXAMPLES 1 to 4

Polyurethane solutions were prepared in the same manner as in Example 1 except that various polyesters given in Table 4 were used instead of Polyester A. Their viscosities at 25° C. were in a range from 1,200 to 2,000 poise. Various properties of the thus obtained polyesters are summarized in Table 4.

EXAMPLES 8 TO 10 AND COMPARATIVE EXAMPLES 5 AND 6

Polyurethane solutions were prepared in the same manner as in Example 1 except that polycarbonates given in Table 4 were used instead of Polyester A. The viscosities of them at 25° C. were in a range of 1200 to 2000 poise. Various properties of the obtained polyurethanes are shown in Table 4.

TABLE 4

| | | | Evaluation of Polyurethane Properties | | | | | |
|---|---|---|---|---|---|---|---|---|
| | Polymeric Diol Component for the Synthesis of Polyurethane | Number Average Molecular Weight of Obtained Polyurethane | Low Temperature Characteristics | | Surface Wear (Abrasion loss mg) | | Resistance to Hydrolysis, Logarithmic Viscosity Retention (%) | Overall Evaluation |
| | | | Tα (°C.) | Bending Resistance (−30° C.) | 20° C. | −25° C. | | |
| Example 1 | Polyester A | 68,000 | −45 | ◯ | 3 | 8 | 82 | ◯ |
| Example 2 | Polyester B | 65,000 | −48 | ◯ | 4 | 10 | 83 | ◯ |
| Example 3 | Polyester C | 72,000 | −51 | ◯ | 2 | 9 | 82 | ◯ |
| Example 4 | Polyester D | 63,000 | −48 | ◯ | 3 | 8 | 80 | ◯ |
| Example 5 | Polyester E | 64,000 | −49 | ◯ | 3 | 7 | 80 | ◯ |
| Example 6 | Polyester F | 66,000 | −51 | ◯ | 2 | 9 | 92 | ◯ |
| Example 7 | Polyester G | 67,000 | −59 | ◯ | 2 | 4 | 94 | ◯ |
| Comparative Example 1 | Polyester H | 68,000 | −13 | X | 85 | 162 | 83 | X |
| Comparative Example 2 | Polyester I | 69,000 | −28 | X | 41 | 95 | 71 | X |
| Comparative Example 3 | Polyester J | 68,000 | −34 | Δ | 10 | 51 | 65 | X |
| Comparative Example 4 | Polyester K | 67,000 | −30 | X | 10 | 61 | 80 | X |
| Example 8 | Polycarbonate A | 70,000 | −35 | ◯ | 8 | 11 | 100 | ◯ |
| Example 9 | Polycarbonate B | 68,000 | −40 | ◯ | 3 | 14 | 98 | ◯ |
| Example 10 | Polycarbonate C | 67,000 | −39 | ◯ | 4 | 12 | 99 | ◯ |
| Comparative Example 5 | Polycarbonate D | 69,000 | −10 | X | 82 | 183 | 100 | X |
| Comparative Example 6 | Polycarbonate E | 70,000 | −20 | X | 4 | 99 | 96 | X |

It is apparent from Table 4 that the polyurethane obtained by the method according to the present invention, which comprises using a polyol containing in the molecule thereof 2-methyl-1,8-octanediol residue, in the preparation of polyurethane from a polymeric polyol and a polyisocyanate, has a markedly good low temperature characteristics and resistance to surface wear, as well as excellent resistance to hydrolysis. The fact that the polyurethane has these highly excellent characteristics shows that the polyurethane possesses the features of both polyether-based polyurethane and polyester-based polyurethane, which has a great meaning in the industry.

What is claimed is:

1. In a method for producing a polyurethane by the reaction consisting essentially of a polymeric polyol with a polyisocyanate, the improvement comprising, using as said polyol a polymeric polyol having in the molecule thereof a group represented by the formula I:

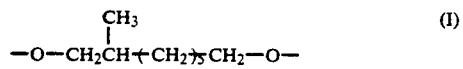

2. A method as defined in claim 1, wherein said polymeric polyol having a group represented by the formula [I] is a polyester polyol having an average molecular weight of 500 to 30,000 obtained by reacting 2-methyl-1,8-octanediol or a mixed glycol containing said diol as a main component, with a dicarboxylic acid, or is a polycarbonate polyol having an average molecular weight of 500 to 30,000 obtained by reacting 2-methyl-1,8-octanediol or a mixed glycol containing said diol as a main component, with a dicarbonate.

3. A method as defined in claim 2, wherein said mixed glycol consists of 2-methyl-1, 8-octanediol and an alkanediol represented by the formula: HO(CH$_2$)$_n$OH wherein n is an integer of 6 to 9.

4. A method as defined in claim 2, wherein said polymeric polyol is said polyester polyol.

5. A method as defined in claim 2, wherein said polymeric polyol is said polycarbonate polyol.

6. A polyurethane obtained by the reaction consisting essentially of a polyisocyanate with a polymeric polyol having in the molecule thereof a group represented by the formula I:

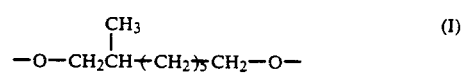

7. A polyurethane as defined in claim 6, wherein said polymeric polyol having a group represented by the formula I is a polyester polyol having an average molecular weight of 500 to 30,000 obtained by reacting 2-methyl-1,8-octanediol or a mixed glycol containing said diol as a main component, with a dicarboxylic acid, or is a polycarbonate polyol having an average molecular weight of 500 to 30,000 obtained by reacting 2-methyl-1,8-octanediol or a mixed glycol containing said diol as a main component, with a dicarbonate.

8. A polyurethane as defined in claim 7, wherein said mixed glycol consists of 2-methyl-1,8-octanediol and an alkanediol represented by the formula: HO(CH$_2$)$_n$OH wherein n is an integer of 6 to 9.

9. The polyurethane as defined in claim 7, wherein said polymeric polyol is said polyester polyol.

10. A polyurethane as defined in claim 7, wherein said polymeric polyol is said polycarbonate polyol.

11. In a method for producing a polyurethane by the reaction consisting essentially of a polymeric polyol and a chain-extender with a polyisocyanate, the improvement comprising, using as said polyol a polymeric polyol having in the molecule thereof a group represented by the formula I:

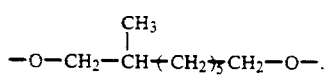 (I)

12. A method as defined in claim 11, wherein said chain-extender is 1,4-butanediol.

13. A polyurethane obtained by the reaction consisting essentially of a polyisocyanate with a chain-extender and a polymeric polyol having in the molecule thereof a group represented by the formula I:

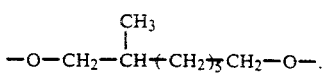 (I)

14. A polyurethane as defined in claim 13, wherein said chain-extender is 1,4-butanediol.

* * * * *